US012380703B2

(12) United States Patent
Oh et al.

(10) Patent No.: US 12,380,703 B2
(45) Date of Patent: Aug. 5, 2025

(54) SENSOR-BASED EVENT TRIGGER FOR STORING SURROUND-VIEW VIDEO

(71) Applicant: HYUNDAI TRANSLEAD, San Diego, CA (US)

(72) Inventors: James Oh, Irvine, CA (US); Jong Seog Lee, Chula Vista, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 239 days.

(21) Appl. No.: 17/858,880

(22) Filed: Jul. 6, 2022

(65) Prior Publication Data

US 2024/0013550 A1 Jan. 11, 2024

(51) Int. Cl.
*G06V 20/58* (2022.01)
*B60W 50/14* (2020.01)

(52) U.S. Cl.
CPC .............. *G06V 20/58* (2022.01); *B60W 50/14* (2013.01); *B60W 2050/146* (2013.01); *B60W 2300/14* (2013.01); *B60W 2420/403* (2013.01)

(58) Field of Classification Search
USPC ......................................................... 358/104
See application file for complete search history.

(56) References Cited

U.S. PATENT DOCUMENTS

| 8,885,046 B1* | 11/2014 | Foster ................... B60Q 1/305 |
| | | 348/148 |
| 2017/0008563 A1 | 1/2017 | Popken et al. |
| 2019/0375357 A1* | 12/2019 | Mezaael ............... B60R 16/023 |
| 2021/0309194 A1* | 10/2021 | Thomas ................... B60D 1/26 |
| 2022/0180488 A1* | 6/2022 | Nakagawa ............... B60R 1/27 |

FOREIGN PATENT DOCUMENTS

| JP | 2006-321357 | * 11/2006 |
| JP | 2006321357 A | * 11/2006 |
| JP | 2006321357 A1 | 11/2006 |

OTHER PUBLICATIONS

International Search Report and Written Opinion received in PCT/US23/23690, mailed on Sep. 5, 2023.

* cited by examiner

Primary Examiner — Jacky X Zheng
(74) Attorney, Agent, or Firm — Knobbe, Martens, Olson & Bear, LLP (57) ABSTRACT

Surround-view monitoring of a trailer, including: monitoring a birds-eye view of an image of the trailer rendered in real-time to visually aid a driver of the trailer during driving and parking; determining whether at least one event has been detected by at least one sensor; storing at least one surround-view video file in a storage device when it is determined that the at least one event has been detected, wherein the at least one surround-view video file includes the birds-eye view of the image of the trailer rendered in real-time using a plurality of cameras positioned about the trailer.

20 Claims, 8 Drawing Sheets

SENSOR-BASED EVENT TRIGGER FOR STORING SURROUND-VIEW VIDEO

BACKGROUND

Field

The present disclosure relates to monitoring of a trailer using surround-view video, and more specifically, to sensor-based event trigger for storing the surround-view video.

Background

Since the growth of online retailers and online shoppers, the transportation industry has grown at rapid pace. To manage this massive transportation of goods, trailers are fitted with GPS/Telematics devices to track is the location of the trailers in real time. Further, many safety sensors are fitted to work with the GPS/Telematics devices to ensure uptime and preventive maintenance of trailers. However, downtime in transit due to accidents and thefts are becoming a major problem since it results in numerous claims and/or lawsuits for the loss and damages.

SUMMARY

The present disclosure provides for event-triggered storage of video captured using surround-view monitor methods and systems.

In one implementation, a method for surround-view mentoring of trailer is disclosed. The method includes monitoring a birds-eye view of an image of the trailer rendered in real-time to visually aid a driver of the trailer during driving and parking. The method also includes determining whether at least one event has been detected by at least one sensor. The method further includes storing at least one surround-view video file in a storage device when it is determined that the at least one event has been detected. In one case, the at least one surround-view video file includes the birds-eye view of the image of the trailer rendered in real-time using a plurality of cameras positioned about the trailer.

In another implementation, a system for surround-view monitoring of a trailer includes a storage device, at least one sensor, a surround-view camera system, and a processor. The at least one sensor detects at least one event. The surround-view camera system includes a plurality of cameras placed about the trailer. The surround-view camera system also captures images of areas around the trailer. The processor receives the captured images of the areas around the trailer and to render a birds-eye view of an image of the trailer in real-time. The processor also determines whether the at least one event has been detected by the at least one sensor. The processor further stores at least one surround-view video file in the storage device when it is determined that the at least one event has been detected. In one case, the at least one surround-view video file includes the birds-eye view of the image of the trailer.

In yet another implementation, a non-transitory computer-readable storage medium storing a computer program to surround-view monitor a trailer is disclosed. The computer program may include executable instructions that cause a computer to monitor a birds-eye view of an image of the trailer rendered in real-time to visually aid a driver of the trailer during driving and parking. The computer program may also include executable instructions that cause a computer to determine whether at least one event has been detected by at least one sensor. The computer program may further include executable instructions that cause a computer to store at least one surround-view video file in a storage device when it is determined that the at least one event has been detected. In one case, the at least one surround-view video file includes the birds-eye view of the image of the trailer rendered in real-time using a plurality of cameras positioned about the trailer.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, downtime in transit due to accidents and thefts are becoming a major problem since it results in numerous claims and/or lawsuits for the loss and damages.

Certain implementations of the present disclosure provide for event-triggered storage of video captured using surround-view monitoring methods and systems. Some implementations of the present disclosure also provide a 360-degree surround-view camera system in the trailer not only to visually aid the driver during driving and/or parking in tight spaces, but also to record and save video footages based on vehicle impact and other sensor triggers. In other implementations, the surround-view camera system can also connect to a high bandwidth GPS/Telematics device to upload saved videos as well as provide live-view images.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In many situations, video footage is a strong evidence in accidents, thefts, and any claims including insurance, lawsuit, and claim handlings. Video footage collected and saved locally and online provides redundancy in case of total loss due to thermal events (e.g., trailer catching on fire or total loss accident). Thus, the owners can identify location and root cause of accidents and thefts by analyzing the data saved on data servers.

Figure 1:
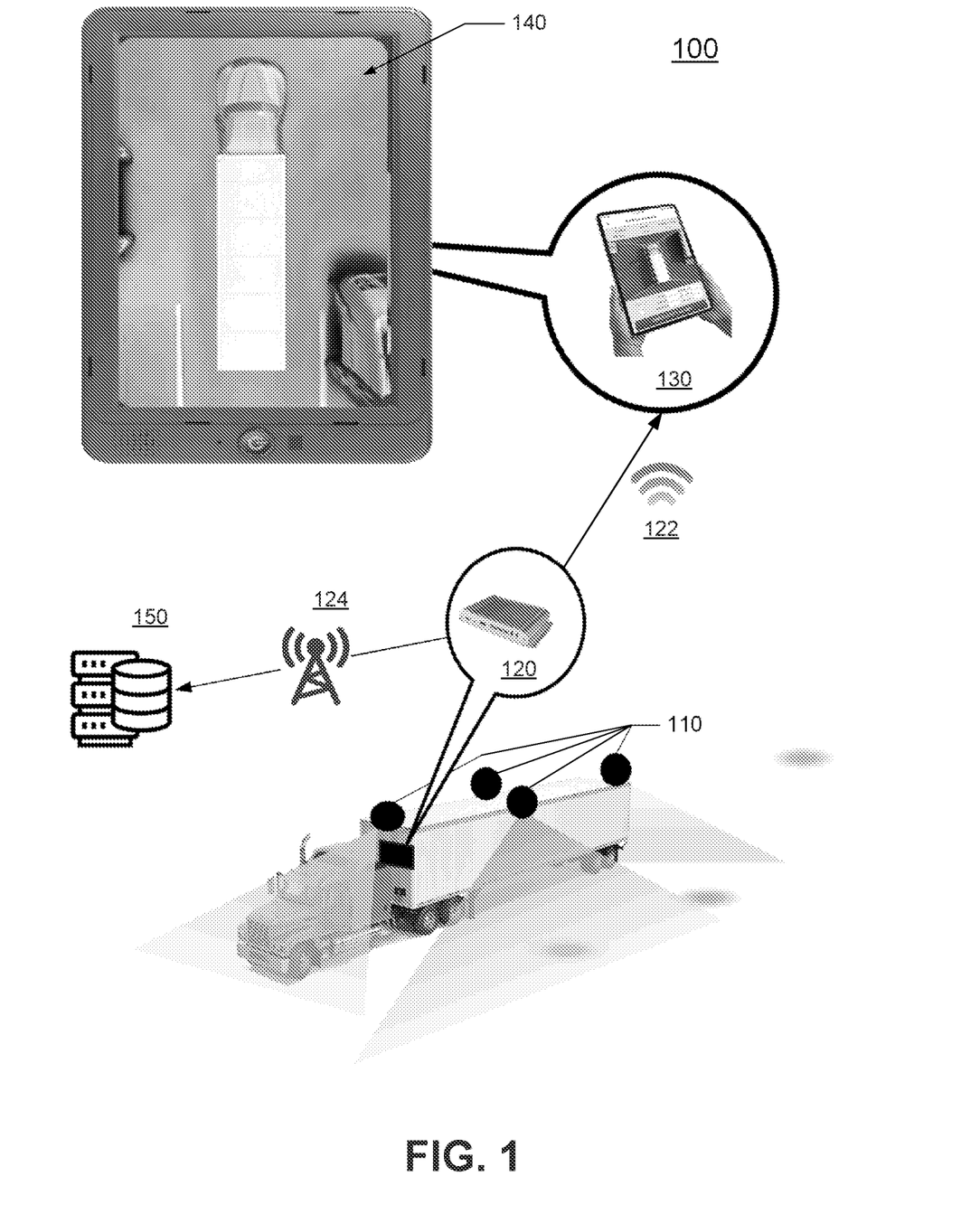
FIG. 1 is an illustration of system and process for surround-view monitoring in accordance with one implementation of the present disclosure.

FIG. 1 is an illustration of system and process for surround-view monitoring in accordance with one implementation of the present disclosure. In the illustrated implementation of FIG. 1, the surround-view monitoring system 100 includes a 360-degree surround-view camera system 110, a video recorder 120 (e.g., a Digital Video Recorder (DVR) with internal storage), and a mobile device 130 (e.g., a mobile phone or tablet device) to provide the driver with a birds-eye view of the trailer image 140 rendered in real-time. In one example implementation, the connection to the mobile device 130 is made through a direct wifi connection 122 to the surround view monitoring (SVM) on the mobile device 130. In one implementation, the birds-eye view of the trailer image 140 is rendered in real-time by a 360-degree surround-view camera system 110, which visually helps the driver during driving and/or parking in tight spaces. In another implementation, the surround-view monitoring system 100 records and saves video footages on the video recorder 120 for recording and saving video files for later viewing. However, since the video recorder 120 may not have enough storage space to save large 360-degree surround-view video files, in one implementation, the saving and storage of the video files is based on vehicle impact and other sensor triggers. In one implementation, the video files are collected and saved locally (e.g., on the DVR) and online (e.g., on client servers 150) to provide redundancy in case of total loss due to thermal events (e.g., trailer catching on fire or total loss accident). Thus, the client can identify location and root cause of accidents and thefts by analyzing the data saved on the client servers 150. In a further implementation, the surround-view camera system 110 connects to a high-bandwidth Telematics device (including GPS) to upload saved videos as well as provide live-view images.

The surround-view monitoring system 100 of FIG. may also include a least one sensor to sense events that may adversely affect the smooth trailer operation. In one implementation the surround-view monitoring system 100 includes at least one of door open/close sensor, tire pressure sensor, cargo sensor, wheel-end sensor (for sensing heat and/or vibration), brake temperature sensor, brake chamber sensor, and other similarly-configured sensors, such as weight sensor and lamp sensor. Further, in one implementation, the surround-view monitoring system 100 is configured to manage the triggering of the saving and storage of the video files based on certain events sensed by the sensors. For example, the events may include overheating of the tire sensed by the wheel-end sensor and/or the low pressure sensed by the tire pressure sensor.

Figure 2A:
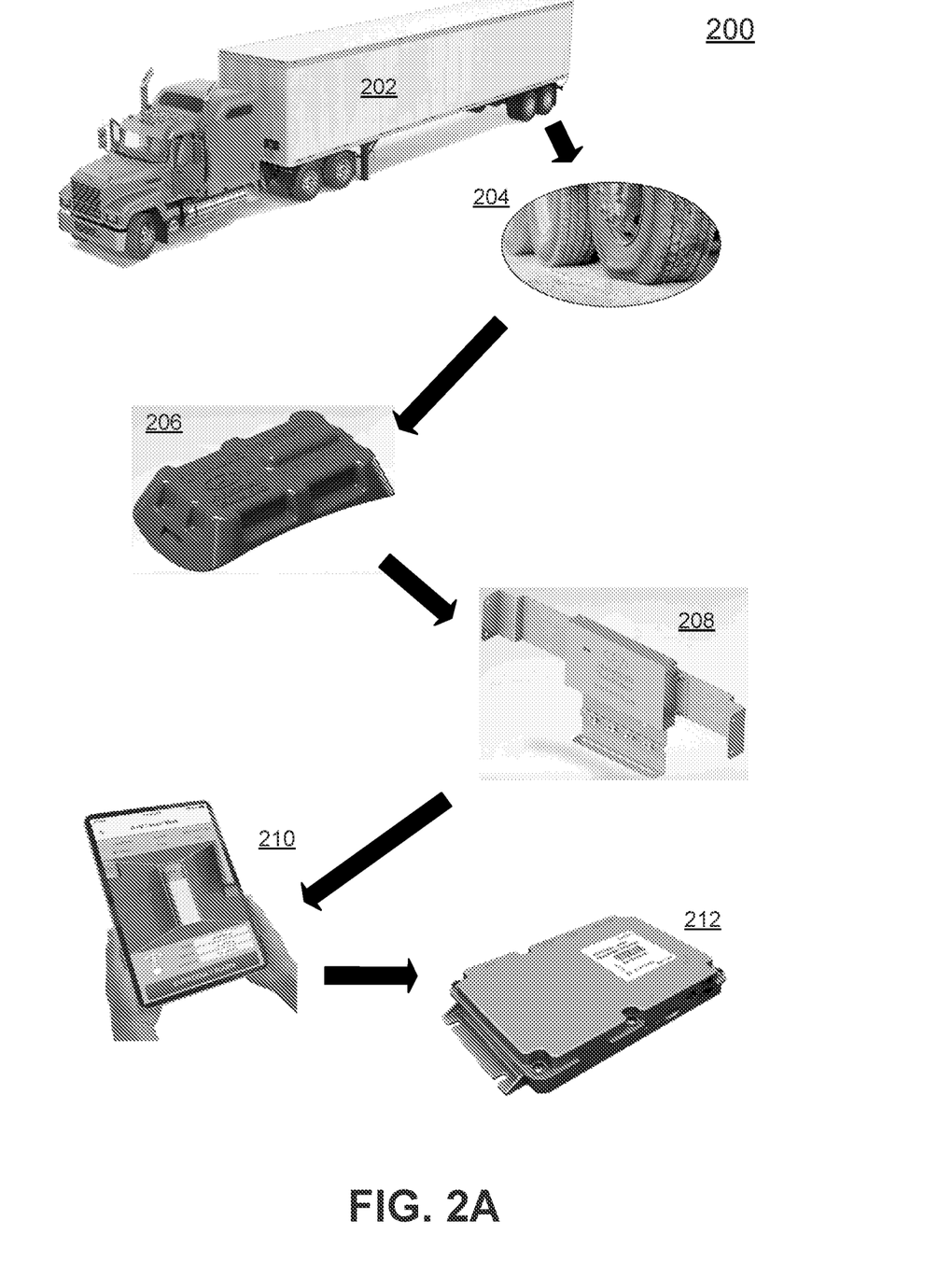
FIG. 2A is an illustration of an example process for surround-view monitoring in accordance with one implementation of the present disclosure.

FIG. 2A is an illustration of an example process for surround-view monitoring 200 in accordance with one implementation of the present: disclosure. In the illustrated implementation of FIG. 2A, the surround-view monitoring process 200 detects an event in which the low pressure of the tire 204 of the trailer 202 causes a tire failure and triggers an alarm 206. In this implementation, a signal is received at the tire pressure monitoring sensor (TPMS) 208 which senses the event (e.g., a flat tire) and causes the SVM application on the mobile device 210 to trigger the saving of video files on a storage unit 212 (e.g., a DVR).

Figure 2B:
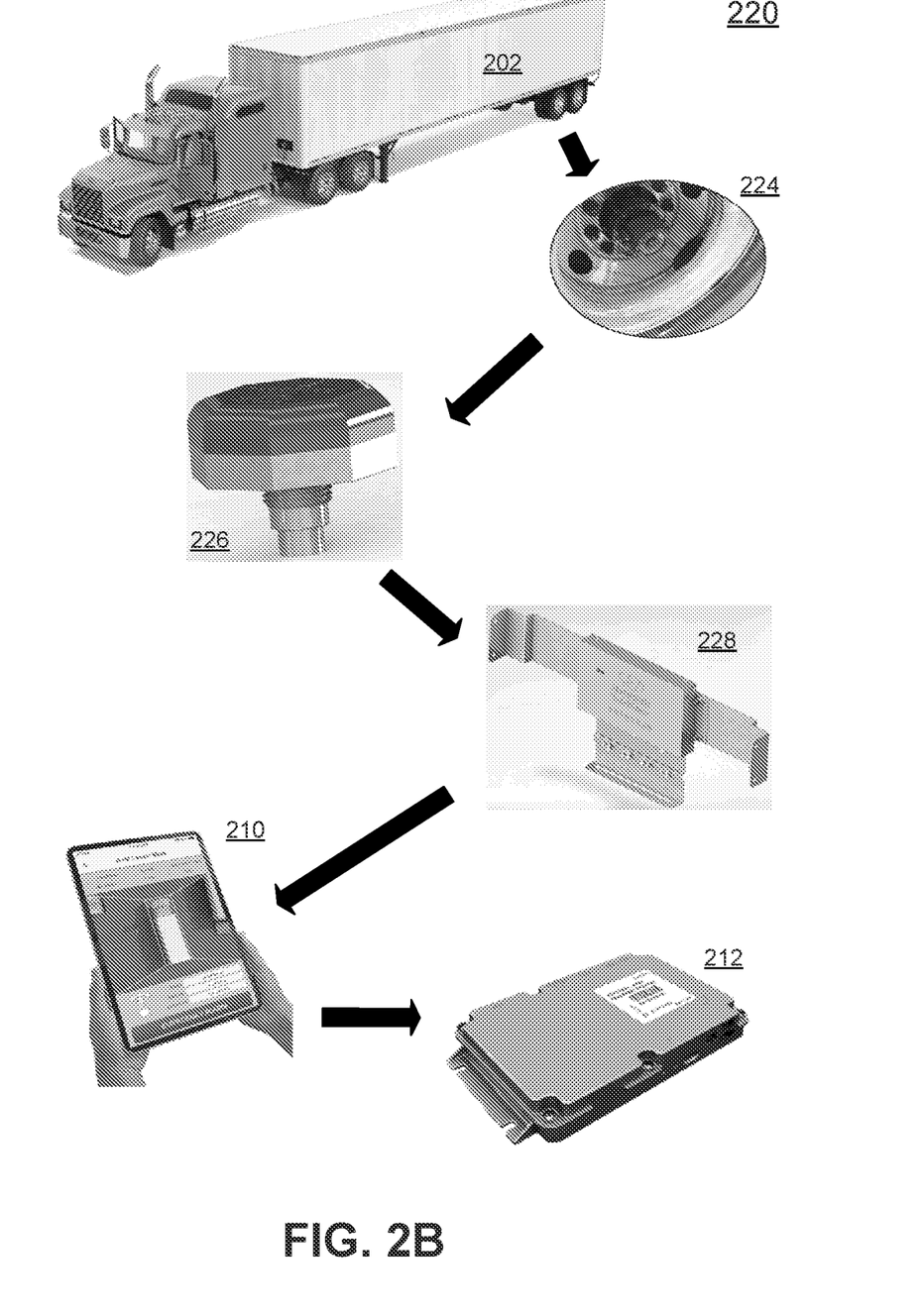
FIG. 2B is an illustration of another example process for surround-view monitoring in accordance with one implementation of the present disclosure.

FIG. 2B is an illustration of another example process for surround-view monitoring 220 in accordance with one implementation of the present disclosure. In the illustrated implementation of FIG. 2B, the surround-view monitoring process 220 detects an event in which the high temperature of the tire 224 of the trailer 222 triggers an alarm 226. In this implementation, a signal is received at the wheel-end temperature sensor (WETS) 228 which senses the event (e.g., high temperature causing "hot" tire) and causes the SVM application on the mobile device 210 to trigger the saving of video files on a storage unit 212 (e.g., a DVR).

Figure 2C:
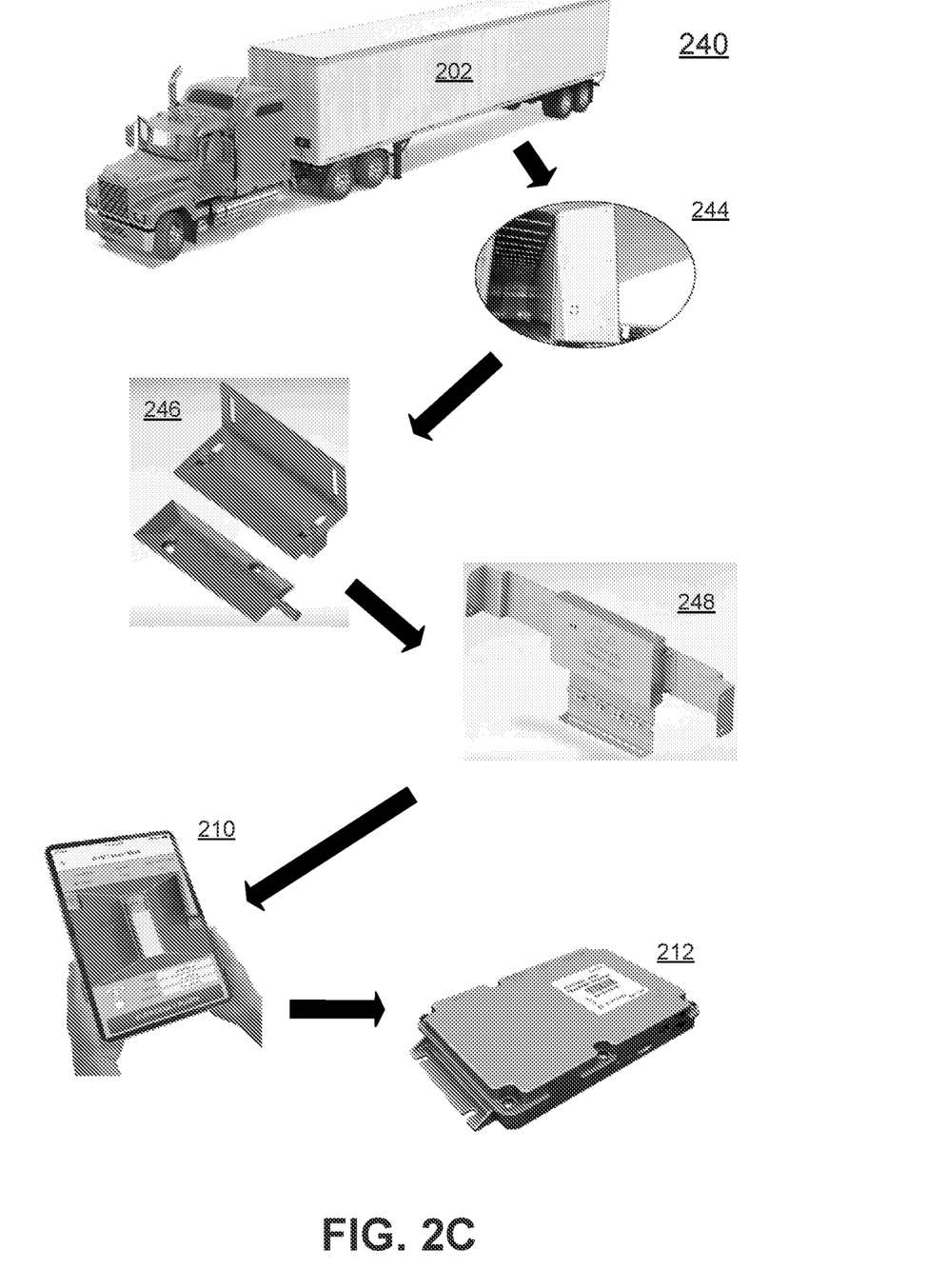
FIG. 2C is an illustration of another example process for surround-view monitoring in accordance with one implementation of the present disclosure.

FIG. 2C is an illustration of another example process for surround-view monitoring 240 in accidence with one implementation of the preset disclosure. In the illustrated implementation of FIG. 2B, the surround-view monitoring process 240 detects an event in which the malfunction/failure of the rear door 244 of the trailer 202 (e.g., the rear door opening) triggers an alarm 246. In this implementation, a signal is received at the door open/close sensor 248 which senses the event (e.g., the door being open) and causes the SVM application on the mobile device 210 to trigger the saving of video files on a storage unit 212 (e.g., a DVR).

Figure 2D:
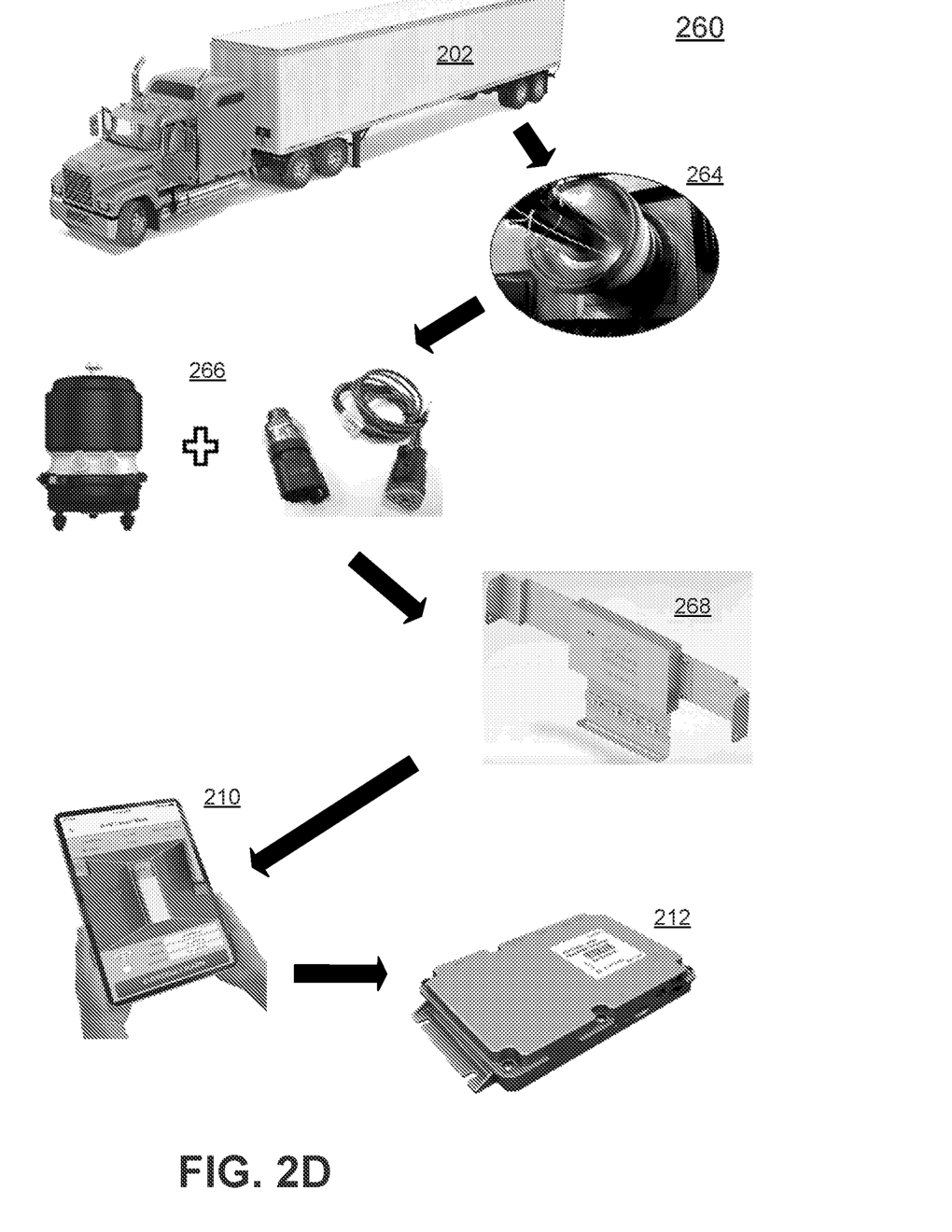
FIG. 2D is an illustration of yet another example process for surround-view monitoring in accordance with one implementation of the present disclosure.

FIG. 2D is an illustration of yet another example process for surround-view monitoring 260 in accordance with one implementation of the present disclosure. In the illustrated implementation of FIG. 2B, the surround-view monitoring process 260 detects an event in which dragging of the brake 264 of the trailer 202 triggers an alarm 266. In this implementation, a signal is received at the brake temperature sensor 268 which senses the event (e.g., high temperature at the brake) and causes the SVM application on the mobile device 210 to trigger the saving of video files on a storage unit 212 (e.g., a DVR).

Figure 3A:
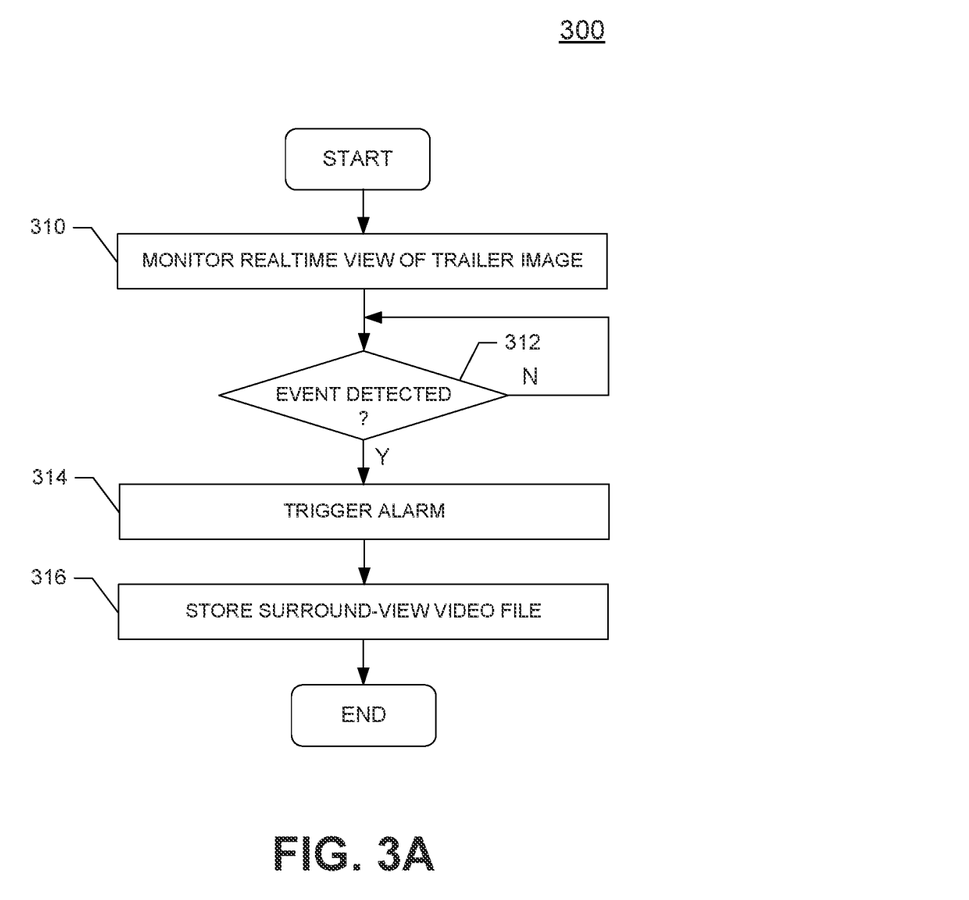
FIG. 3A is a flow diagram of a method for surround-view monitoring in accordance with one implementation of the present disclosure.

FIG. 3A is a flow diagram of a method 300 for surround-view monitoring in accordance with one implementation of the present disclosure. In one implementation, the process 300 manages the SVM application using at least one of: a 360-degree surround-view camera system, a video recorder 120, a mobile device, and at least one sensor in one implementation the at least one sensor includes at least one of door open/close sensor, tire pressure sensor, cargo sensor, wheel-end sensor, brake temperature sensor, brake chamber sensor, and other similarly-configured sensors, such as weight sensor and lamp sensor. In one implementation, the process 300 is programmed into a hardware processor to manage the SVM application.

In the illustrated implementation of FIG. 3A, the surround-view monitoring process 300 monitors, at block 310, a real-time birds-eye view of the trailer image rendered in real-time to visually aid the driver during driving and parking. The surround-view monitoring process 300 also determines, at block 312, whether an event has been detected by at least one sensor. In one implementation, the event includes at least one of: (1) opened door sensed by a door sensor; (2) flat or low tire pressure sensed by a tire pressure sensor; (3) cargo damage sensed by a cargo sensor; (4) wheel damage or defect sensed by a wheel-end sensor; (5) high brake temperature sensed by a brake temperature sensor; (6) brake dragging sensed by a brake chamber sensor; and (7) other defect or damage sensed by similarly-configured sensors, such as weight sensor and lamp sensor. In another implementation, the event includes vehicle impact such as collision with another vehicle or object(s).

In one implementation, once the event is detected, at block 312, an alarm is triggered, at block 314. Further, the process 300 also triggers storing of at least one surround-view video file, at block 316. In one implementation, a surround-view video file is a birds-eye view of the image of a vehicle (e.g., a trailer image) rendered in real-time using a plurality of cameras positioned about the vehicle. Since the surround-view video file provides the birds-eye view of the vehicle image rendered in real-time, any malfunctioning or failure of critical part(s) of the trailer can be monitored and the video of the malfunctioning or failure can be saved for detailed examination of the critical part(s) at a later time. In some implementations, the surround-view camera system can also connect to a high bandwidth GPS/Telematics device to upload saved videos as well as provide live-view images.

In one implementation, the storage of the surround-view video file into a storage device when the event is detected includes storing the birds-eye view of the image of the vehicle from a first preset time before the event to a second preset time after the event. For example, initially, the birds-eye view of the vehicle image is rendered in real-time and the video file is saved in the direct access memory but is periodically overwritten because of the limited space in the memory. When a flat tire is detected, for example, the video file including the birds-eye view of the vehicle image is stored in the storage device which provides more permanent storage with much more space than the direct access memory. In one example, the saved video file includes the birds-eye view video of the vehicle image 5 minutes before and 5 minutes after the event (i.e., the flat tire).

In a particular implementation, a method for surround-view monitoring of a trailer is disclosed. The method includes: monitoring a birds-eye view of an image of the trailer rendered in real-time to visually aid a driver of the trailer during driving and parking; determining whether at least one event has been detected by at least one sensor; storing at least one surround-view video file in a storage device when it is determined that the at least one event has been detected, wherein the at least one surround-view video file includes the birds-eye view of the image of the trailer rendered in real-time using a plurality of cameras positioned about the trailer.

In one implementation, the method further includes triggering an alarm when it is determined that the at least one event has been detected. In one implementation, the at least one sensor includes at least one of a door open/close sensor, a tire pressure sensor, a cargo sensor, a wheel-end sensor, a brake temperature sensor, a brake chamber sensor, a weight sensor, and a lamp sensor. In one implementation, the at least one event includes at least one of: an opened door sensed by the door open/close sensor; a flat or low tire pressure sensed by the tire pressure sensor; a cargo damage sensed by the cargo sensor; a wheel damage or defect sensed by the wheel-end sensor; a high brake temperature sensed by the brake temperature sensor; brake dragging sensed by the brake chamber sensor; a weight problem sensed by the weight sensor; and a lamp issue sensed by the lamp sensor. In one implementation, detecting the at least one event includes detecting malfunctioning or failure of at least one critical part of the trailer. In one implementation, the at least one critical part of the trailer includes at least one of doors, tires, cargo, wheels, brakes, brake chambers, and lamps. In one implementation, the method further includes uploading the at least one surround-view video file stored in the storage device to an online server. In one implementation, the storage device includes a video recorder.

Figure 3B:
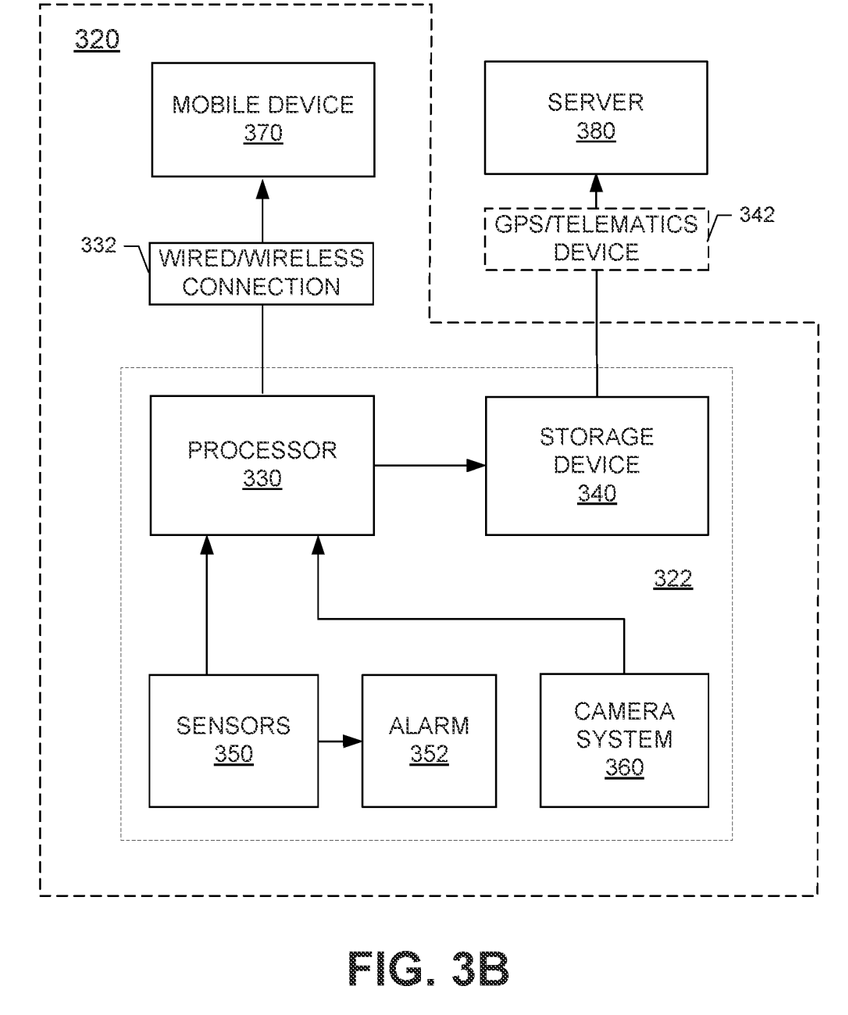
FIG. 3B is a block diagram of a system for surround-view monitoring in accordance with one implementation of the present disclosure.

FIG. 3B is a block diagram of a system 320 for surround-view monitoring in accordance with one implementation of the present disclosure. In the illustrated implementation of FIG. 3B, the surround-view monitoring system 320 includes a processor 330, a storage device 340, at least one sensor 350, a 360-degree surround-view camera system 360, and an alarm 352, all of which may be disposed within the trailer 322. The surround-view monitoring system 320 of FIG. 3B also includes a mobile device 370 with the SVM application installed on the device, which may be disposed outside of the trailer 322 (e.g., in the cab of the truck). In one implementation, the at least one sensor 350 includes at least one of door open/close sensor, tire pressure sensor, cargo sensor, wheel-end sensor, brake temperature sensor, brake chamber sensor, and other similarly-configured sensors, such as weight sensor and lamp sensor.

In one implementation, the processor 330 receives video from the 360-degree surround-view camera system 360 and renders a birds-eye view of the trailer image in real-time. The rendered trailer image is then transmitted to the mobile device 370 to provide the driver with a birds-eye view of the trailer image in real-time. In one implementation, the surround-view monitoring system 320 monitors the real-time birds-eye view of the trailer image rendered in real-time to visually aid the driver during driving and parking. In one implementation, the connection between the mobile device 370 and the processor 330 is made using a wifi connection 332. In another implementation, the connection between the mobile device 370 and the processor 330 is made using a wired connection 332. When the surround-view monitoring system 320 determines that at least one sensor 350 has detected at least one event, an alarm 352 is triggered. When the event is detected, the system 320 also triggers the storing of at least one surround-view video file onto the storage device 340. As indicated above, the event may include at least one of: (1) opened door sensed by a door sensor; (2) flat or low tire pressure sensed by a tire pressure sensor; (3) cargo damage sensed by a cargo sensor; (4) wheel damage or defect sensed by a wheel-end sensor; (5) high brake temperature sensed by a brake temperature sensor; (6) brake dragging sensed by a brake chamber sensor; and (7) other defect or damage sensed by similarly-configured sensors, such as weight sensor and lamp sensor.

In one implementation, the storage device 340 is a DVR. In another implementation, the storage device 340 is a direct access memory unit. In a further implementation, the surround-view video files are collected and stored locally on the storage device 340 and online such as on a server 380 to provide redundancy in case of total loss of the trailer 322 due to thermal events (e.g., trailer catching on fire or total loss accident). In some implementations, the surround-view camera system 360 can also connect to a high bandwidth GPS/Telematics device 342 to upload the stored video files as well as provide live-view images.

In a particular implementation, a system for surround-view monitoring of a trailer is disclosed. The system includes: a storage device; at least one sensor to detect at least one event; a surround-view camera system including a plurality of cameras placed about the trailer, the surround-view camera system to capture images of areas around the trailer; a processor to receive the captured images of the areas around the trailer and to render a birds-eye view of an image of the trailer in real-time, the processor to determine whether the at least one event has been detected by the at least one sensor, the processor to store at least one surround-view video file in the storage device when it is determined that the at least one event has been detected, wherein the at least one surround-view video file includes the birds-eye view of the image of the trailer.

In one implementation, the system further includes an alarm to be triggered when it is determined that the at least one event has been detected. In one implementation, the at least one sensor includes at least one of: a door open/close sensor, a tire pressure sensor, a cargo sensor, a wheel-end sensor, a brake temperature sensor, a brake chamber sensor, a weight sensor, and a lamp sensor. In one implementation, the at least one event includes at least one of: an opened door sensed by the door open/close sensor; a flat or low tire pressure sensed by the tire pressure sensor; a cargo damage sensed by the cargo sensor; a wheel damage or defect sensed by the wheel-end sensor; a high brake temperature sensed by the brake temperature sensor; brake dragging sensed by the brake chamber sensor; a weight problem sensed by the weight sensor; and a lamp issue sensed by the lamp sensor. In one implementation, the at least one event includes malfunctioning or failure of at least one critical part of the trailer. In one implementation, the at least one critical part of the trailer includes at least one of doors, tires, cargo, wheels, brakes, brake chambers, and lamps. In one implementation, the storage device includes a video recorder placed in the trailer. In one implementation, the storage device includes an online storage server. In one implementation, the system further includes a mobile device with a surround-view monitoring application installed, wherein the surround-view monitoring application monitors the birds-eye view of the image of the trailer rendered in real-time by the processor.

Figure 4A:
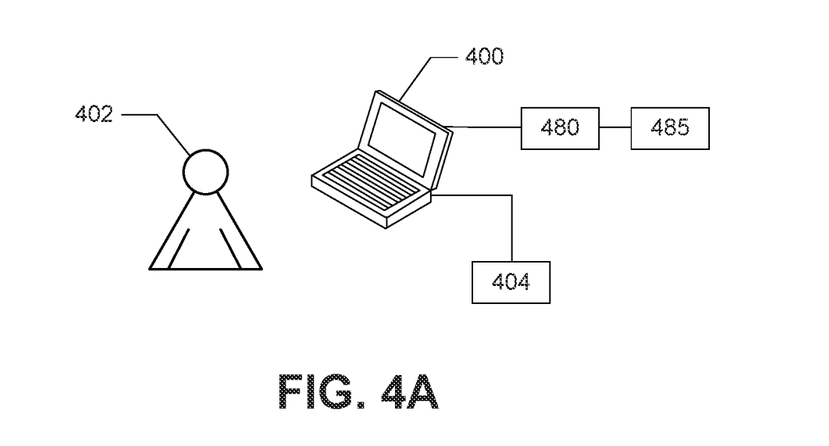
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a surround-view monitor (SVM) application 490 with respect to the process 300 of FIG. 3A and the system 320 of FIG. 3B.

Figure 4B:
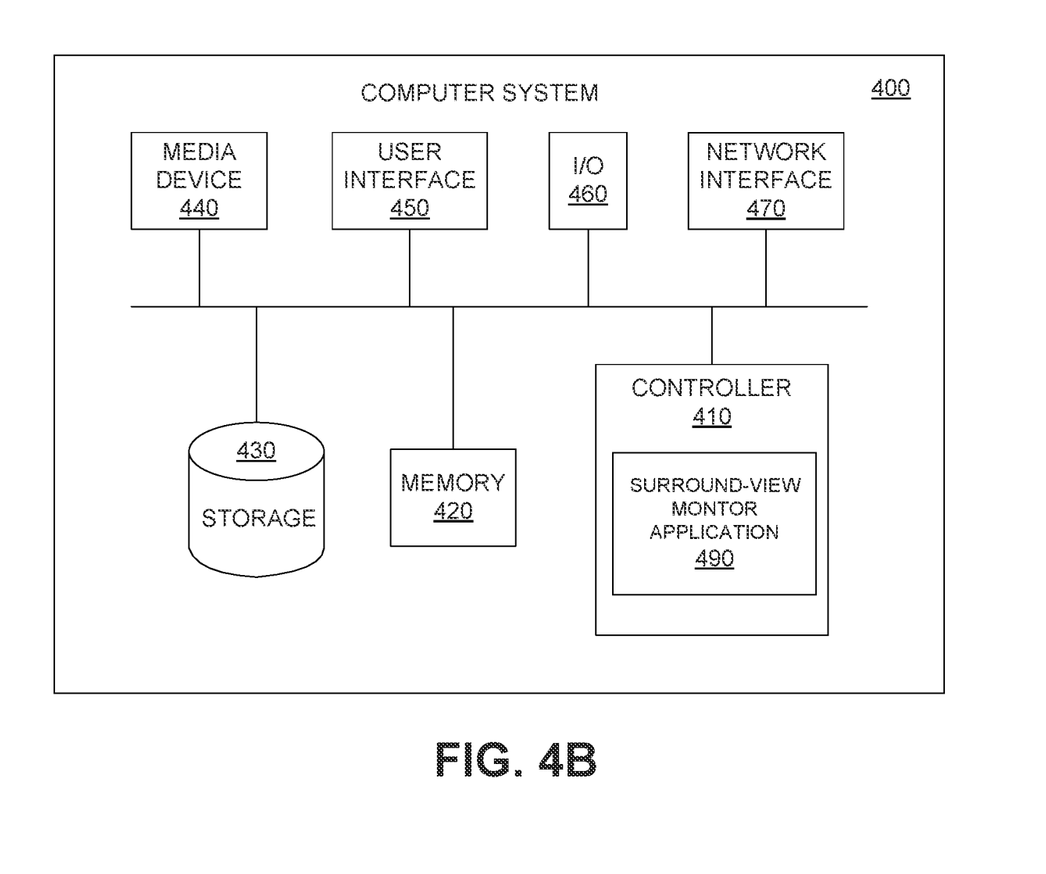
FIG. 4B is a functional block diagram illustrating the computer system hosting a surround view monitoring (SVM) application in accordance with an implementation of the present disclosure.

The computer system 400 stores and executes the SVM application 490 of FIG. 4B. In addition, the computer system 400 may be in communication with a software program 404. Software program 404 may include the software code for the SVM application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the SVM application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the SVM application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the SVM application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the SVM application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. In another implementation, the user interface 450 also includes a headset worn by the user and used to collect eye movements as user inputs. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In a particular implementation, a non-transitory computer-readable storage medium storing a computer program to surround-view monitor a trailer is disclosed. The computer program includes executable instructions that cause a computer to: monitor a birds-eye view of an image of the trailer rendered in real-time to visually aid a driver of the trailer during driving and parking; determine whether at least one event has been detected by at least one sensor; store at least one surround-view video file in a storage device when it is determined that the at least one event has been detected, wherein the at least one surround-view video file includes the birds-eye view of the image of the trailer rendered in real-time using a plurality of cameras positioned about the trailer.

In one implementation, the executable instructions that cause a computer to detect the at least one event includes executable instructions that cause a computer to detect malfunctioning or failure of at least one critical 1s part of the trailer. In one implementation, the computer program further includes executable instructions that cause a computer to upload the at least one surround-view video file stored in the storage device to an online server.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for surround view monitoring of a trailer, the method comprising:
   monitoring birds-eye view of images of the trailer rendered in real-time to visually aid a driver of the trailer during driving and parking, wherein the real-time birds-eye view of images are stored in a first storage device;
   determining whether at least one event has been detected by at least one sensor;
   storing at least one surround-view image in a second storage device in response to determining that the at least one event has been detected,
   wherein the at least one surround-view image comprises one or more of the monitored birds-eye view of the images captured after detecting the at least one event, and
   wherein the at least one surround-view image includes one or more of the monitored birds-eye view of the images of the trailer rendered in real-time using a plurality of cameras positioned about the trailer.

2. The method of claim 1, further comprising triggering an alarm when it is determined that the at least one event has been detected.

3. The method of claim 1, wherein the at least one sensor includes at least one of a door open/close sensor, a tire pressure sensor, a cargo sensor, a wheel-end sensor, a brake temperature sensor, a brake chamber sensor, a weight sensor, and a lamp sensor.

4. The method of claim 3, wherein the at least one event includes at least one of: an opened door sensed by the door open/close sensor; a flat or low tire pressure sensed by the tire pressure sensor; a cargo damage sensed by the cargo sensor; a wheel damage or defect sensed by the wheel-end sensor; a high brake temperature sensed by the brake temperature sensor; brake dragging sensed by the brake chamber sensor; a weight problem sensed by the weight sensor; and a lamp issue sensed by the lamp sensor.

5. The method of claim 1, wherein detecting the at least one event includes detecting malfunctioning or failure of at least one critical part of the trailer.

6. The method of claim 5, wherein the at least one critical part of the trailer includes at least one of doors, tires, cargo, wheels, brakes, brake chambers, and lamps.

7. The method of claim 1, further comprising uploading the at least one surround-view image stored in the first storage device to an online server.

8. The method of claim 1, wherein at least one of the first and second storage devices includes a video recorder.

9. A system for surround view monitoring of a trailer the system comprising:
   a first storage device;
   a second storage device;
   at least one sensor to detect at least one event;
   a surround-view camera system including a plurality of cameras placed about the trailer, the surround-view camera system to capture images of areas around the trailer;
   a processor to receive the captured images of the areas around the trailer and to render a birds-eye view of an image of the trailer in real-time, the processor to store the rendered birds-eye view of the image to the first storage device, the processor to determine whether the at least one event has been detected by the at least one sensor, the processor to store at least one surround-view image in the second storage device upon determining that the at least one event has been detected,
   wherein the at least one surround-view image includes the birds-eye view of the image of the trailer captured after detecting the at least one event.

10. The system of claim 9, further comprising an alarm to be triggered when it is determined that the at least one event has been detected.

11. The system of claim 9, wherein the at least one sensor includes at least one of a door open/close sensor, a tire pressure sensor, a cargo sensor, a wheel-end sensor, a brake temperature sensor, a brake chamber sensor, a weight sensor, and a lamp sensor.

12. The system of claim 11, wherein the at least one event includes at least one of: an opened door sensed by the door open/close sensor; a flat or low tire pressure sensed by the tire pressure sensor; a cargo damage sensed by the cargo sensor; a wheel damage or defect sensed by the wheel-end sensor; a high brake temperature sensed by the brake temperature sensor; brake dragging sensed by the brake chamber sensor; a weight problem sensed by the weight sensor; and a lamp issue sensed by the lamp sensor.

13. The system of claim 9, wherein the at least one event includes malfunctioning or failure of at least one critical part of the trailer.

14. The system of claim 13, wherein the at least one critical part of the trailer includes at least one of doors, tires, cargo, wheels, brakes, brake chambers, and lamps.

15. The system of claim 9, wherein at least one of the first and second storage devices includes a video recorder placed in the trailer.

16. The system of claim 9, wherein the first storage device includes an online storage server.

17. The system of claim 9, further comprising a mobile device with a surround-view monitoring application installed, wherein the surround-view monitoring application monitors the birds-eye view of the image of the trailer rendered in real-time by the processor.

18. A non-transitory computer-readable storage medium storing a computer program to surround view monitoring of a trailer, the computer program comprising executable instructions that cause a computer to:
   monitor birds-eye view of images of the trailer rendered in real-time to visually aid a driver of the trailer during driving and parking, wherein the real-time birds-eye view of images are stored in a first storage device;

determine whether at least one event has been detected by at least one sensor;

store at least one surround-view image in a second storage device in response to determining that the at least one event has been detected, wherein the at least one surround-view image comprises one or more of the monitored birds-eye view of the images captured after detecting the at least one event, and wherein the at least one surround-view image includes one or more of the monitored birds-eye view of the images of the trailer rendered in real-time using a plurality of cameras positioned about the trailer.

19. The non-transitory computer-readable storage medium of claim 18, wherein the executable instructions that cause a computer to detect the at least one event comprises executable instructions that cause a computer to detect malfunctioning or failure of at least one critical part of the trailer.

20. The non-transitory computer-readable storage medium of claim 18, further comprising executable instructions that cause a computer to upload the at least one surround-view image stored in the first storage device to an online server.

* * * * *